United States Patent Office 3,575,883
Patented Apr. 20, 1971

3,575,883
SURFACTANT COMPOSITIONS
John T. Foley, Verona, N.J., assignor to
Witco Chemical Corporation
No Drawing. Filed June 14, 1965, Ser. No. 463,874
Int. Cl. B01f 17/08; C11d 1/28
U.S. Cl. 252—354                              6 Claims

ABSTRACT OF THE DISCLOSURE

Water-soluble surfactant compositions which are stable in strong alkaline solutions and which are useful as detergents and emulsifiers and which comprise mixtures of (a) condensation products of long chain aliphatic monocarboxylic acids, diethanolamine, and mononuclear aromatic polybasic acids in certain molar ratios to each other, depending upon whether the mononuclear aromatic polybasic acid is dicarboxylic, tricarboxylic, tetracarboxylic or hexacarboxylic, illustrated by a condensation product of 1 mol of a long chain aliphatic monocarboxylic acid, 6 to 7.5 mols of diethanolamine, and 2 to 2.4 mols of phthalic anhydride, with (b) sulfonated aliphatic unsaturated carboxylic acids.

My invention relates to novel improved surfactant compositions.

The novel surfactant compositions of the present invention comprise: (A) condensation products of diethanolamine, long chain monocarboxylic acids containing from 8 to 14 carbon atoms and aromatic polybasic acids in certain molar ratios with respect to each other, and (B) a member selected from the group consisting of sulfonated aliphatic unsaturated carboxylic acids (alkali metal, amine and ammonium salts of said sulfonated aliphatic unsaturated carboxylic acids) and mixtures thereof. Said condensation products utilized in the compositions of the present invention are described in detail in copending application Ser. No. 354,424 filed Mar. 24, 1964, now U.S. Pat. No. 3,373,173, which is embodied herein by reference.

Condensation products of diethanolamine with long chain monocarboxylic acids, and condensation products of diethanolamine with aromatic polybasic acids have long been known in the art, the former being disclosed, for instance, in Kritchevsky U.S. Patents Reissue No. 21,530 and No. 2,089,212, and the latter in Kritchevsky U.S. Pat. No. 2,094,608. Those condensation products disclosed in Pat. No. 2,089,212, exemplified particularly by condensation products of 2 mols of diethanolamine with approximately 1 mol of $C_{12}$–$C_{14}$ fatty acids, have gone into large commercial use as detergents and for other surfactant uses in a number of industries.

The prior art products of the type exemplified by condensation products of diethanolamine and $C_{12}$–$C_{14}$ fatty acids, particularly those in which the mol ratio of the diethanolamine to the $C_{12}$–$C_{14}$ fatty acids is approximately 2 to 1, are very predominantly amides, with quite small amounts of esters and ester-amides and containing, also, uncondensed diethanolamine, at least some of which is present in the final condensation product in the form of diethanolamine soaps of the $C_{12}$–$C_{14}$ fatty acids. Such condensation products are quite readily dispersible in water. Generally speaking, they have reasonable solubility in water, the extent of such water-solubility being related to the extent to which amidification of the diethanolamine with the $C_{12}$–$C_{14}$ fatty acids has been effected. It is known to the art that, if the condensation reaction is carried out so that there is a relatively high content of esters or ester-amides in the final condensation product, water-solubility is decreased. Hence, techniques have heretofore been developed to influence equilibrium conditions so as to influence the condensation reaction, or resort has been had to post-condensation reaction treatments, to bring about amide formation to the maximum extent reasonably possible. Condensation products of the type referred to above in which approximately 2 mols of diethanolamine are condensed with 1 mol of $C_{12}$–$C_{14}$ fatty acids, are generally characterized by a pH, in aqueous solution, say in a 3% solution in water, of about 9.2.

Condensation products made in accordance with copending application Serial No. 354,424, now U.S. Patent No. 3,373,173, are characterized by exceptional solubility in water as well as in aqueous solutions of various electrolytes. This is despite the fact that the reactants and the molar ratios thereof which are utilized, which are described below, would seem to dictate that products of impaired water-solubility would be obtained. Furthermore, the pH of the condensation products of said copending application is generally materially lower than the pH of the condensation products of prior art products such as those referred to above, the pH of typical condensation products of said copending application for instance, in 3% solutions in water, falling within the range of 7.4 to 7.7. The condensation products appear to have an appreciable content of residual uncondensed carboxyl groups which appear to be present in the form of the monoamide of the aromatic polybasic acid, said monoamide being present in the form of the diethanolamine salt thereof, which may account for their low pH values. Despite such residual uncondensed carboxyl groups, which, in diethanolamine-higher fatty acid condensation products of the prior art, also tend to impair water-solubility, these condensation products, as stated above, possess, surprisingly, exceptionally good water-solubility, especially in the presence of electrolytes.

It is an object of the present invention to provide new and improved surfactant compositions which have exceptional solubility in water as well as in aqueous solutions of various electrolytes.

It is another object of the present invention to provide new and improved surfactant compositions which have exceptional solubility and stability in strong alkaline solutions.

In accordance with the invention, it has been discovered that a surprising and highly desirable enhancement in the solubility and stability of the condensation products of copending application 354,424, now U.S. Pat. No. 3,373,173, in strong alkaline solutions is obtained by incorporating therewith a sulfonated aliphatic unsaturated carboxylic acid or the water-soluble salts thereof. The improved surfactant compositions of the present invention, utilizing the condensation products of said copending application, comprise, by weight, for instance and by way of illustration, about 50 to 95 percent of the condensation product of diethanolamine, long chain monocarboxylic acids containing from 8 to 14 carbon atoms and aromatic polybasic acids in certain molar ratios with respect to each other and about 50 to 5 percent and preferably between about 10 and 25 percent of a member selected from the group consisting of sulfonated aliphatic unsaturated carboxylic acids, alkali metal, amine and ammonium salts of sulfonated aliphatic unsaturated carboxylic acids, and mixtures of the same.

The sulfonated aliphatic unsaturated carboxylic acids used pursuant to the present invention contain from 4 to 22 carbon atoms especially 16 to 18 carbon atoms and can be prepared by any of the well known sulfonation procedures including reacting an unsaturated aliphatic carboxylic acid with sodium bisulfite, sulfur trioxide, oleum, chlorosulfonic acid, sodium sulfite or sulfuric acid; or reacting an alkali metal sulfite with the chloro acetate ester of a hydroxy carboxylic acid such as alpha-hydroxylauric acid.

The unsaturated aliphatic carboxylic acids that are suitable for preparing the sulfonated acid of the present invention contain from 4 to 22 carbon atoms and may be supplied in various forms as, for instance, the free acid or as an ester of the free acid or as an anhydride of a dibasic acid as, for example, maleic anhydride. Illustrative examples of the unsaturated aliphatic carboxylic acids include oleic acid, linoleic acid, linolenic acid, and tall oil fatty acids. Where, as stated above, the unsaturated aliphatic carboxylic acid is supplied in the form of an ester of the free acid, illustrative examples of such esters are methyl or glycerol esters of fatty acids or mixed fatty acids derived from linseed oil, cotton seed oil, corn oil, castor oil and soya bean oil.

In the production of the condensation products of said copending application utilized in the compositions of the present invention the molar ratios of the ingredients utilized are as follows: for each mol of long chain monocarboxylic acid (or the equivalent thereof contained in an ester thereof if such is utilized as the source of said acid), there should be not substantially less than 2 mols nor substantially more than 3 mols of the aromatic polybasic acid, and by "substantially" we mean of the order of 20% molarly less or more, as the case may be. The amount of diethanolamine utilized in producing the condensation products should include 1.2 mols for each mol of long chain monocarboxylic acid plus 2.4 mols for each mol of aromatic dicarboxylic acid, or 3.6 mols for each mol of aromatic tricarboxylic acid, or 4.8 mols for each mol of aromatic tetracarboxylic acid, or 7.2 mols for each mol of aromatic hexacarboxylic acid, and, as will be understood, equivalent amounts of diethanolamine where mixtures of said aromatic carboxylic acids are used. Additional diethanolamine may be added without adverse effect but ordinarily should be avoided because of economic considerations. Generally, any such added amounts should not exceed 1 to 1.5 mols. By way of further illustration, where 1 mol of coconut oil mixed fatty acids, or other long chain monocarboxylic acid, and 2 mols of phthalic anhydride, or other aromatic dibasic acid, are utilized, the number of mols of diethanolamine to be employed in conjunction therewith in the condensation reaction should not exceed 10 mols and, more advantageously should lie within the range of 6 to 7 mols. A range of 6.5 to 6.7 mols of diethanolamine is especially desirable in this particular instance. Again, by way of further explanation, where 1 mol of coconut oil mixed fatty acids, or other long chain monocarboxylic acid, and 2 mols of benzene tricarboxylic acid, or other aromatic tribasic acid, are utilized, the number of mols of diethanolamine to be employed in the condensation reaction should not exceed 14 mols and, more advantageously, should lie within the range of 8.4 to 9 mols, with a range of 8.5 to 8.7 being particularly preferred. Further where 1 mol of long chain monocarboxylic acid and 3 mols of aromatic tribasic acid are utilized, it will be seen that the diethanolamine will be used in amounts in the range of 12 to 20 mols with 12 to 12.5 mols being preferred.

Especially important embodiments of the condensation products useful in the compositions of the present invention are those produced by reacting (a) 1 mol of lauric acid, or myristic acid, or coconut oil mixed fatty acids or fractions thereof which are particularly high in their content of $C_{12}$–$C_{14}$ fatty acids, as such, or in the form of an ester such as the methyl esters or the triglyceride esters of said fatty acids (taking into account the fatty acids content thereof), (b) about 2 mols of phthalic anhydride, and (c) from about 6 to 6.8 and, better still, from 6.5 to 6.6 mols of diethanolamine; the reaction being carried out at a temperature in the range of about 300 to 335° F. and, better still, in the range of about 320 to 330° F., under a high vacuum, generally of the order of 20 to 27 and, preferably, in the range of about 24 to 26 inches of mercury, for about 2 hours, whereupon the condensation products are promptly cooled so as rapidly to reduce the temperature thereof to about 210° F. or below, after which water is admixed therewith, generally in proportions of the order of 10 to 15%, by weight of the condensation products, so as to render the resulting composition pourable and pumpable.

The long chain monocarboxylic acid constituent of the condensation products useful in the compositions of the present invention may be supplied in various forms as, for instance, as the free acid or as an ester of the free acid as, for example, a methyl ester or as a glyceride ester such as the triglyceride ester. The long chain monocarboxylic acid may contain as low as 8 carbon atoms and as high as 14 carbon atoms. Especially useful, particularly where the condensation products are used for detergent purposes, are commercial sources of fatty acids containing predominately from 12 to 14 carbon atoms. Illustrative examples of the long chain monocarboxylic acids include caprylic acid, pelargonic acid, lauric acid, myristic acid. Commercial mixtures of such monocarboxylic acids will usually be used, for economic reasons, as, for instance, coconut oil fatty acids or special fractions thereof which are especially high in lauric acid or myristic acid or mixtures of said $C_{12}$ and $C_{14}$ fatty acids. Where, as stated above, the long chain monocarboxylic acid is supplied in the form of an ester, illustrative examples of such esters are methyl ester of lauric acid, methyl ester of myristic acid, methyl ester of coconut oil mixed fatty acids, coconut oil, palm kernel oil, and babassu oil.

Various aromatic polybasic acid constituents can be utilized in the production of the condensation products herein described, illustrative examples of which are phthalic acid, advantageously in the form of phthalic anhydride; isophthalic acid; hexahydrophthalic acid; terephthalic acid; mellitic acid, advantageously in the form of mellitic anhydride, prennitic acid, mellophanic acid, pyromellitic acid, hemimellitic acid, trimellitic acid and trimesic acid; and aromatic polybasic acid constituents having ring substituents of a type which do not adversely affect the water-solubility of the condensation products, suitable substituents being, for instance, hydroxyl and sulfonic groups. Phthalic anhydride is especially useful in the production of the condensation products used in the compositions of this invention and its use, therefore, represents a particularly preferred, though limited, embodiment of the aromatic polybasic acid constituent utilized. It will be understood that the aromatic polybasic acid constituent may be supplied in the form of the free acid, or in the form of the anhydride as stated above, or it may be in the form of an ester as, for instance, the methyl or ethyl esters of the aromatic polybasic acid. It will be understood that mixtures of two or more aromatic polybasic acids or acid constituents can be used, if desired, although, usually, no especial advantages result therefrom.

Diethanolamine, in its commercial form as purchased, is most advantageously used as such in the production of the condensation products used in the compositions of this invention. Relatively small or minor proportions of other alkanolamines can be added thereto or admixed therewith and the condensation products produced therefrom. Such other alkanolamines include, for example, monoethanolamine, mono-isopropanolamine, diisopropanolamine, diethylethanolamine, and glycerolamines. Where utilized, they should not, generally speaking, be employed in amounts in excess of about 10% of the weight of the diethanolamine.

The following examples are illustrative of the practice of the present invention. They are not to be construed as in any way limitative of the scope of the invention since numerous other surfactant compositions can readily be produced in the light of the teachings and guiding principles disclosed herein.

EXAMPLE 1

(a) A stainless steel kettle is charged with 2784 pounds of diethanolamine, the contents are heated to about 215° F., agitated and a stream of gaseous nitrogen is bubbled through the diethanolamine. Then, 816 pounds of coconut oil mixed fatty acids are added while maintaining the temperature in the range of 210 to 220° F., followed by the addition of 1200 pounds of phthalic anhydride, all under conditions of agitation. The kettle is closed, then placed under a vacuum of 24 to 26 inches of mercury and the contents heated to 330° F. and held under said vacuum and temperature conditions for 2 hours or until a sample, when added to separate aqueous solutions of (1) 25% caustic soda, (2) 25% sulfuric acid, and (3) 25% brine, and (4) plain tap water, in the form of one drop of the condensation product to 50 ml. of each of said solutions and of the tap water, produces a clear solution. Before sampling, the vacuum is desirably reduced to 8 inches with nitrogen gas.

(b) The condensation product, weighing 4464 pounds, is rapidly passed through a heat exchanger, to cool it quickly to about 212° F., into a holding tank, the vacuum and nitrogen are cut, and 400 pounds of water are sucked into said holding tank, under conditions of agitation, until the final solution is homogeneous. The water content can be adjusted as desired, preferably to about 10 or 12%, by weight, of the finished solution. The condensation product, prior to admixture of the water therewith, is a clear, amber glassy gel essentially non-flowing at room temperature, becoming fluid at about 175° F. It can also be rendered fluid, as indicated above, by the addition thereto of suitable amounts of water, or by the addition of suitable amounts of ethanol. Several drops of the condensation product were added to tap water and a 25 percent aqueous solution of sodium metasilicate in the ratio of one drop of sample to 50 ml. of solution. A clear, stable solution was formed in tap water whereas a hazy product resulted in the sodium metasilicate solution that settled on standing.

(c) To 80 weight parts of the condensation product from (b) above were added 20 weight parts of the sodium salt of sulfonated oleic acid. Several drops of the resulting solution were then added to tap water and a 25 percent aqueous solution of sodium metasilicate. In both instances a clear, stable solution was formed.

EXAMPLE 2

(a) 200 pounds of coconut oil mixed fatty acids, 332 pounds of isophthalic acid, and 695 pounds of diethanolamine are placed in a kettle and heated at about 300° F. for 4 hours under a vacuum of about 26 inches of mercury, with agitation, or until the solubility characteristics specified in Example 1 are obtained. The resulting condensation product is then rapidly cooled to room temperature. Several drops of this product were then added to tap water and a 25 percent aqueous solution of sodium metasilicate in the ratio of one drop per 50 ml. of solution. A clear, stable solution was formed in water while a hazy product resulted in the sodium metasilicate solution that settled on standing.

(b) To 70 weight parts of the condensation product from (a) above were added 30 weight parts of sulfonated tall oil fatty acids. Several drops of this composition were added to tap water and a 25 percent aqueous solution of sodium metasilicate in the same ratio as above with clear stable solutions being formed in both instances.

EXAMPLE 3

(a) 213 pounds of the methyl esters of coconut oil mixed fatty acids, 398 pounds of dimethyl phthalate, 685 pounds of diethanolamine, and 10 pounds of sodium methylate are placed in a kettle and heated at about 275° F. for 4 hours under a vacuum of about 26 inches of mercury, with agitation, or until the solubility characteristics specified in Example 1 are obtained. The resulting condensation product is rapidly cooled to room temperature. Samples of the condensation product were tested as noted in Example 1(b) above in tap water and an aqueous sodium metasilicate solution with similar results.

(b) 40 weight parts of the sodium salt of sulfonated maleic anhydride were blended with 60 weight parts of the condensation product from (a) above. The solubility test described above were run with this composition and clear stable solutions were obtained.

EXAMPLE 4

(a) 200 pounds of a fraction of coconut oil mixed fatty acids containing at least 90% lauric acid, 296 pounds of phthalic anhydride, and 700 pounds of diethanolamine are placed in a kettle and heated at about 330° F. for 2 hours under a vacuum of about 26 inches of mercury, with agitatilon, or until the solubility characteristics set forth in Example 1 are obtained. The resulting condensation product is rapidly cooled to room temperature. The solubility characteristics of this condensation product in tap water and a 25 percent aqueous sodium metasilicate solution were similar to those described in Examples 1(b), 2(a), and 3(a).

(b) A blend of 40 percent by weight of sulfonated linseed oil fatty acids and 60 percent by weight of the condensation product from 4(a) above was prepared and evaluated as in Examples 1(c), 2(b) and 3(b) with similar results being obtained.

Surfactant compositions made in accordance with the present invention are clear liquid solutions that are characterized by exceptional solubility in water as well as in aqueous alkaline solutions and in aqueous solutions of various electrolytes. Furthermore, the pH of the surfactant compositions of my invention is generally materially lower than the pH of prior art products referred to previously, the pH, for instance, in 3% solutions in water, falling within the approximate range of 7.4 to 7.7.

In addition to possessing excellent water-solubility, and excellent solubility in aqueous alkaline solutions as well as in aqueous solutions of various electrolytes, surfactant compositions made pursuant to this invention are, generally, readily soluble in various alcohols, ketones, chlorinated hydrocarbons and aromatic hydrocarbons such as methyl alcohol, ethyl alcohol, isopropyl alcohol, acetone, trichlorethylene, benzene and toluene. They exhibit surface activity over a wide range of concentrations in water and in aqueous solutions of alkalies, and various salts, from very dilute to very concentrated. Illustrative of such solutions in which said surfactant compositions exhibit foaming and other surface active properties are 30% solutions in water of potassium hydroxide, sodium hydroxide, and sodium chloride. In the case of the sodium hydroxide solution, the condensation products have a gelling effect thereon which creates an apparent haze in said solution due to air entrained in the gel.

In the case of the surfactant composition of Example 1(c), surface tension measurements, using various concentrations by weight, in distilled water and in the stated solution of mixed electrolyte show the following results:

Distilled water (con. by wt.)

| Percent surfactant: | Surface tension (dynes/cm.) |
|---|---|
| .01 | 33.2 |
| 0.1 | 31.8 |
| 0.5 | 32.7 |

11% sulfuric acid, 1% copper sulfate solution (conc. by wt.)

| Percent surfactant: | Surface tension (dynes/cm.) |
|---|---|
| .01 | 32.1 |
| 0.1 | 32.3 |
| 0.5 | 31.9 |

It may be noted that most synthetic detergents lower the surface tension of water generally to somewhere in the approximate range of 30 to 35 dynes/cm. when present in concentrations from 0.1 to 0.5% but are ineffective in strong or concentrated solutions of electrolytes. Surfactant compositions of the present invention, exemplified by Example 1(c), however, are effective not only in water but also in a wide range of concentrations of electrolytes in aqueous solution.

Various supplemental ingredients can be incorporated into the surfactant composition or used in conjunction therewith to meet certain specific end uses. By way of example, liquid alkaline materials may be added to the composition to increase the pH of the surfactant composition, act as a coupling agent for the sulfonated acid and condensation product or serve as a diluent for the surfactant composition. Illustrative examples of liquid alkaline materials include alkanolamines, polyamines, ammonia or aqueous solutions of water soluble bases such as sodium or potassium hydroxide or carbonate.

The compositions of the invention have utility in a wide variety of fields. Apart from their use as detergents, they are effective as emulsifiers, where, for instance, they produce aqueous-oleaginous emulsions which are useful in many fields such as cleaning and degreasing of metals, cosmetic creams, shampoos, and pesticidal compositions. One illustrative utility as an emulsifying agent is the preparation of emulsions of water with hydrophobic organic solvents such as toluene and xylene. Good emulsions can be made, for example, of (1) water, (2) 25% aqueous solution of sodium hydroxide, (3) 25% aqueous solution of potassium hydroxide, (4) 25% aqueous solution of sulfuric acid, and (5) 25% aqueous solution of sodium chloride, in each case with 10% toluene, using 1% of a composition such as is produced in accordance with Example 1.

The compositions of the invention find use in the textile industry in kier boiling, wool fulling, cotton mercerizing, dyeing and soaping off operations; in the petroleum industry as water flood additives, oil field emulsions demulsifiers, drilling mud additives, in work over fluids and in acidizing operations; in the steel industry as pickling bath additives, wetting agents for caustic solutions, in lubricant compositions, and as corrosion inhibitors; in the detergent, cleansing and cosmetic fields, as in built liquid detergents, in specialized industrial cleaning compositions, synthetic detergent bars, specialty shampoos and specialty cleansers; in the paper industry, as wetting agents in pulp digestion operations and as gelling agents in sizing operations; and, in general, for uses in which detergents and surfactants are commonly employed in the art.

What I claim as new and desire to be protected by Letters Patent of the United States is:

1. A water-soluble surfactant consisting essentially of:
  (A) a water-soluble surfactant condensation product resulting from heating together at condensation temperatures of a mixture of (a) a long chain aliphatic monocarboxylic acid containing from 8 to 24 carbon atoms, (b) diethanolamine, and (c) a mononuclear aromatic polybasic acid, the anhydrides and esters thereof, said ingredients being present in a molar ratio as follows:
    (a) 1 mol of (a)
    (b) 1.2 mols of (b) for each mol of said monocarboxylic acid, plus molar proportions of (b) selected from the following:
      (i) 2.4 mols of (b) for each mol of mononuclear aromatic dicarboxylic acid
      (ii) 3.6 mols of (b) for each mol of mononuclear aromatic tricarboxylic acid
      (iii) 4.8 mils of (b) for each mol of mononuclear aromatic tetracarboxylic acid
      (iv) 7.2 mols of (b) for each mol of mononuclear aromatic hexacarboxylic acid
      (v) plus from 0 to 1.5 mols of (b)
    (c) 2 to 3 mols of (c) calculated on the free acid basis; and
  (B) a member selected from the group consisting of sulfonated $C_4$–$C_{22}$ aliphatic hydrocarbon unsaturated carboxylic acids, alkali metal, amine and ammonium salts of sulfonated aliphatic hydrocarbon unsaturated carboxylic acids, and mixtures thereof, said composition comprising from about 50 to 95%, by weight, of (A) and from about 50 to about 5%, by weight, of (B).

2. The water soluble surfactant composition of claim 1 wherein the sulfonated aliphatic hydrocarbon unsaturated carboxylic acid cntains from 16 to 18 carbon atoms.

3. A surfactant composition consisting essentially of:
  (A) a water soluble surfactant condensation product resulting from heating together at condensation temperatures of a mixture of (a) a long chain aliphatic monocarboxylic acid containing from 8 to 24 carbon atoms, (b) diethanolamine, and (c) a mononuclear aromatic dibasic acid, said ingredients being present in a molar ratio substantially as follows:
    1 mol of (a)
    6 to 7.5 mols of (b)
    2 to 2.4 mols of (c); and
  (B) a member selected from the group consisting of sulfonated aliphatic hydrocarbon unsaturated carboxylic acids containing from 4 to 22 carbon atoms, alkali metal, amine and ammonium salts of sulfonated aliphatic hydrocarbon unsaturated carboxylic acids containing from 4 to 22 carbon atoms and mixtures thereof, said composition comprising from about 50 to 95%, by weight, of (A) and from about 50 to aobut 5%, by weight of (B).

4. A surfactant composition consisting essentially of:
  (A) between about 50 and 95 percent by weight of a water soluble condensation product resulting from heating together at condensation reaction temperatures of a mixture of (a) fatty acid consisting of predominately $C_{12}$–$C_{14}$ fatty acids, (b) diethanolamine, and (c) phthalic anhydride, said ingredients being present in a molar ratio substantially as follows:
    1 mol of (a)
    6 to 7 mols of (b)
    2 to 2.4 mols of (c); and
  (B) between about 50 and 5 percent by weight of a member selected from the group consisting of sulfonated aliphatic hydrocarbon unsaturated carboxylic acids containing from 4 to 22 carbon atoms, alkali metal, amine and ammonium salts of sulfonated aliphatic hydrocarbon unsaturated carboxylic acids containing from 4 to 22 carbon atoms and mixtures thereof.

5. The surfactant composition as set forth in claim 4 wherein said condensation product is between about 75 and 90 percent by weight and said member (B) is between about 25 and 10 percent by weight.

6. A surfactant composition consisting essentially of:
(A) between about 50 and 95 percent by weight of a water-soluble condensation product produced by reacting (a) 1 mol of a member selected from the group consisting of predominately $C_{12}$–$C_{14}$ fatty acids, (b) 6 to 7 mols of diethanolamine, and (c) about 2 mols of phthalic anhydride at a temperature in the range of 300 to 330° F. until the condensation product is readily soluble in water; and
(B) between about 50 and 5 percent by weight of the sodium salt of a sulfonated oleic acid.

References Cited

UNITED STATES PATENTS

| | | | |
|---|---|---|---|
| 3,345,301 | 10/1967 | Stein | 252—152 |
| 3,377,290 | 4/1968 | Stein | 252—152 |
| 3,373,173 | 3/1968 | Foley et al. | 260—404 |
| 2,173,448 | 9/1919 | Katzman et al. | 260—404 |
| 2,343,431 | 3/1944 | Wells et al. | 252—356 |
| 2,427,481 | 9/1947 | Weible et al. | 252—355 |

RICHARD D. LOVERING, Primary Examiner

U.S. Cl. X.R

8—86; 252—8.5, 8.55, 137, 138, 152, 156, 158, 161, 174, 309, 312, 316, 334, 355, 391; 424—171